United States Patent [19]

Swales et al.

[11] Patent Number: 4,601,372

[45] Date of Patent: Jul. 22, 1986

[54] AUTOMATICALLY ENGAGEABLE AND DISENGAGEABLE DRIVE COUPLER MECHANISM

[75] Inventors: Barton L. Swales; Richard L. Boens, both of Coal Valley, Ill.

[73] Assignee: Deere & Company, Moline, Ill.

[21] Appl. No.: 546,832

[22] Filed: Oct. 31, 1983

[51] Int. Cl.⁴ .......................... F16D 11/06; F16D 3/48
[52] U.S. Cl. .............................. 192/67 R; 464/137; 464/138
[58] Field of Search ............ 192/67 R; 464/137, 138, 464/901; 403/57, 58, 74

[56] References Cited

U.S. PATENT DOCUMENTS

| | | | |
|---|---|---|---|
| 268,807 | 12/1882 | Landis | 464/138 |
| 1,506,400 | 8/1924 | Wynne | 192/67 R |
| 2,148,975 | 2/1939 | Agren | 464/137 |
| 2,345,303 | 3/1944 | Suiter | 192/67 R |
| 2,439,479 | 4/1948 | Mackmann | 464/138 |
| 2,444,148 | 6/1948 | Warwick | 192/67 R |
| 2,619,211 | 11/1952 | Belden | 192/67 R |
| 3,053,362 | 9/1962 | Doble et al. | 192/67 R |
| 3,362,143 | 1/1968 | Gullickson | 192/67 R |
| 3,633,384 | 1/1972 | Jarren | 464/137 |
| 3,982,670 | 9/1976 | Brass | 222/177 |
| 4,137,853 | 2/1979 | Peterson | 111/67 |

FOREIGN PATENT DOCUMENTS 501183  4/1920  France ........................ 464/137

Primary Examiner—Alan Cohan
Assistant Examiner—John A. Rivell
Attorney, Agent, or Firm—Fraser and Bogucki

[57] ABSTRACT

An automatically engageable and disengageable drive coupler mechanism is provided in which separate drive and driven couplers are automatically coupled to and uncoupled from each other simply by moving the couplers into and out of contact with each other in a radial direction or an axial direction or a combination thereof. The driven coupler includes a lug arrangement rotatably mounted on a mounting member at the end of a driven shaft and having a pair of driven lugs on opposite sides of the driven shaft which are rotatable about an axis intersecting and normal to the axis of elongation of the driven shaft. A leaf spring coupled to the mounting member resiliently biases the lug arrangement into a neutral position in which the lugs extend outwardly in the direction of the axis of elongation of the driven shaft while at the same time permitting rotation of the driven lugs out of the neutral position in either of opposite directions against the resistance of the spring. The drive coupler employs a drive gear or other drive member in conjunction with a two-lug arrangement which may be rigidly mounted on the drive gear or which may be rotatable against spring resistance in a manner similar to the lug assembly of the driven coupler.

11 Claims, 23 Drawing Figures

Fig. 13
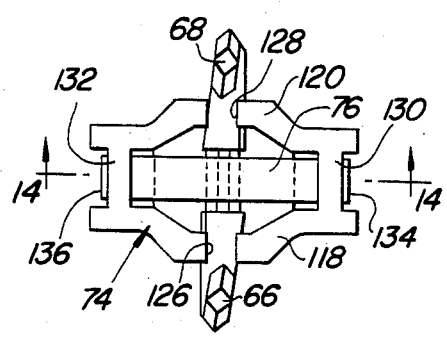
Fig. 14
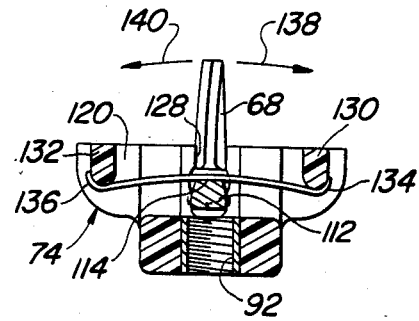
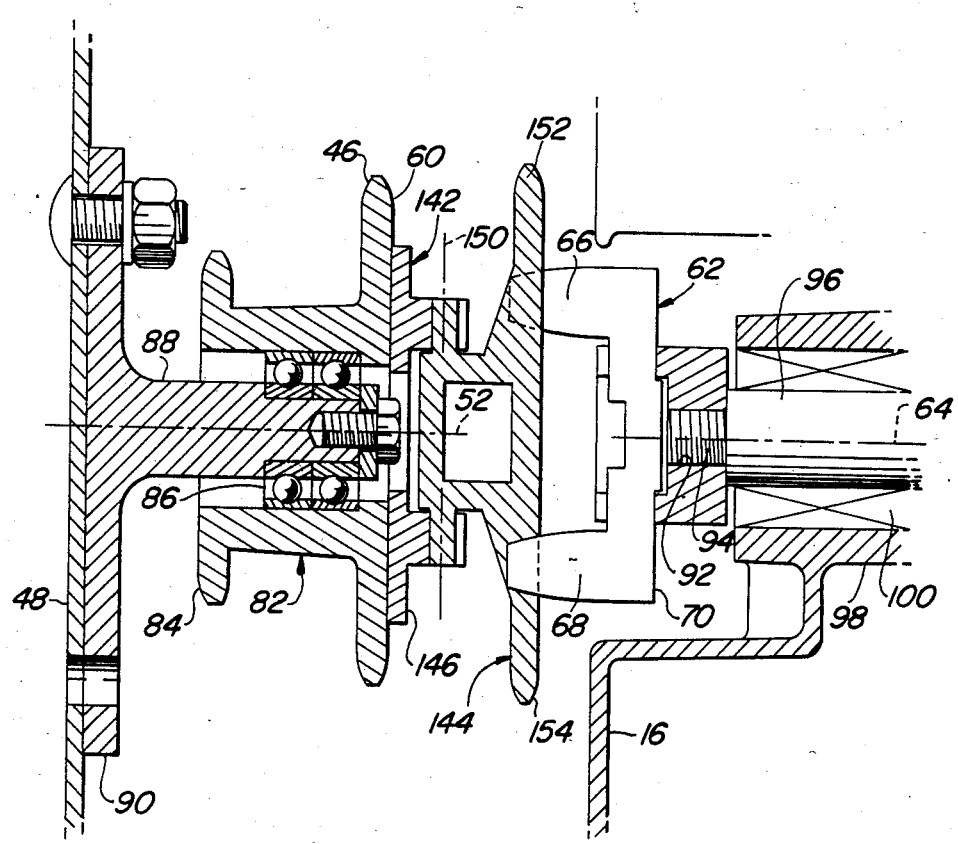
Fig. 15 ial application of Lundie et al, the co-pending application of Lundie et al, the seed hopper and attached seed meter may have to be removed under circumstances which permit little if any lateral movement of the seed meter or coupler mechanism in the direction of the axis of a drive gear or other drive member forming part of the planter drive train. Instead, removal and installation of the hopper and seed meter may require essentially movement in a radial direction relative to the drive gear. This places further demands on the drive coupler mechanism, particularly if such mechanism is to be capable of automatic engagement and disengagement without the need for manual assistance. Moreover, such a drive coupler mechanism would have to be capable of automatic connection and disconnection from virtually any rotational position of the driving and driven parts thereof, again without the need for manual assistance. Moreover, such a drive coupler mechanism should be able to tolerate a small amount of axial and radial misalignment between the driving and driven portions thereof to allow for tolerances in mounting the seed hopper and its included seed meter.

AUTOMATICALLY ENGAGEABLE AND DISENGAGEABLE DRIVE COUPLER MECHANISM

BACKGROUND OF THE INVENTION

1. Field of the Invention

The present invention relates to rotatable drive arrangements, and more particularly to rotatable drive arrangements in which a driven portion of the arrangement is selectively engaged with or disengaged from a drive portion of the arrangement.

2. History of the Prior Art

There are various situations in which a rotatable drive coupler mechanism must be provided in which a driven portion or coupler thereof can be uncoupled from a drive portion or coupler thereof. The requirement therefor may occur, for example, where a subassembly which is installed in and rotatably driven by a machine must be removable from the machine.

One example of an arrangement requiring a rotatable drive coupler mechanism which must be disengageable is provided by a co-pending application of Lundie et al, Ser. No. 546,834, filed Oct. 31, 1983 and commonly assigned with the present application. The Lundie et al application describes a vacuum seed meter for metering or dispensing seeds therefrom during a planting operation. The vacuum seed meter is coupled to the base of a seed hopper which in turn is mounted on a planting unit. The seed hopper is capable of containing a quantity of seeds to be metered. The seed meter contains a seed disk which is rotatably driven during operation thereof. Rotatable driving of the seed disk is accomplished by coupling a planter drive train to the seed disk within each seed meter.

In seed meters of the type described in the Lundie et al application, it is periodically necessary that the seed hopper and the attached seed meter be removed from the planting unit for various purposes including opening of the seed meter to change the seed disk therein or to clean out the inside of the seed disk or the hopper. For this reason a drive coupler mechanism must be provided which couples the planter drive train to the seed meter when the seed hopper and seed meter are mounted on the planter frame and which uncouples the seed meter from the planter drive train to permit removal of the seed hopper and the seed meter.

One example of a disengageable drive coupler mechanism for use with a seed meter is described in U.S. Pat. No. 3,982,670 of Brass. The drive coupler mechanism in the Brass patent couples the planter drive train to the seed meter in disengageable fashion with an arrangement which spring biases a cylindrical sleeve into engagement with a drive shaft pin to maintain coupling therebetween. The resistance of the spring bias may be overcome to disengage the sleeve from the pin to provide uncoupling of the seed meter from the planter drive train. Both coupling and uncoupling must be done by hand which is inconvenient and time consuming. Such requirement for manual manipulation is particularly disadvantageous in those planters where the planting units and their included seed hoppers and seed meters must be placed relatively close to one another to achieve narrow row to row spacing. In such arrangements the small amount of space between planting units may make it very difficult if not impossible to manually effect coupling and uncoupling using an arrangement such as that described in the Brass patent when a seed meter and its associated hopper are removed or installed.

In drive coupler units using pairs of engaging pins, any radial misalignment of the drive and driven shafts results in a speed change. When the shafts are misaligned, only one pin is driving at a time. During the transition between pins, there is a dead spot in which one pin slides until the other pin engages.

In the case of the planter described in the previously referred to co-pending application of Lundie et al, the seed hopper and attached seed meter may have to be removed under circumstances which permit little if any lateral movement of the seed meter or coupler mechanism in the direction of the axis of a drive gear or other drive member forming part of the planter drive train. Instead, removal and installation of the hopper and seed meter may require essentially movement in a radial direction relative to the drive gear. This places further demands on the drive coupler mechanism, particularly if such mechanism is to be capable of automatic engagement and disengagement without the need for manual assistance. Moreover, such a drive coupler mechanism would have to be capable of automatic connection and disconnection from virtually any rotational position of the driving and driven parts thereof, again without the need for manual assistance. Moreover, such a drive coupler mechanism should be able to tolerate a small amount of axial and radial misalignment between the driving and driven portions thereof to allow for tolerances in mounting the seed hopper and its included seed meter.

BRIEF DESCRIPTION OF THE INVENTION

The invention provides a drive coupler mechanism which is automatically engageable and disengageable without the need for any manual assistance. The drive coupler mechanism which may be used for applications such as the driving of a seed meter within a planter has separate drive and driven couplers which are disengageable and reengageable with movement of the driven coupler relative to the drive coupler in an axial direction or a radial direction or other direction which is a combination thereof. Automatic engagement occurs with virtually any rotational position of the driven coupler relative to the drive coupler. The drive coupler mechanism tolerates axial and radial displacement of the driven coupler relative to the drive coupler, making it advantageous for use with seed meters where considerable tolerance may be present in the mounting of a seed hopper and associated seed meter. Radial misalignment is also tolerated, and since both driven lugs are in continuous contact with the drive lugs, the dead spot that might otherwise occur is eliminated to minimize acceleration-deceleration problems of misaligned shafts.

The driven coupler within drive coupler mechanisms according to the invention includes a pair of driven lugs disposed on opposite sides of a driven shaft and the axis of rotation thereof. The driven lugs extend outwardly in a common direction from the opposite ends of a lug assembly mounted within a mounting block which is secured to the end of the driven shaft. A resilient member in the form of a leaf spring mounted within the mounting block extends over a relatively flat portion of the lug assembly intermediate the driven lugs to normally bias the lug assembly into a neutral position in which the lugs extend outwardly from the end of the driven shaft in a direction generally parallel to the axis of elongation of the driven shaft. The leaf spring permits rotation of the lug assembly and the included driven lugs in opposite directions from the neutral position against a resilient bias provided thereby to facilitate automatic engagement with and disengagement from the drive coupler.

In one arrangement of a drive coupler mechanism according to the invention, the drive coupler includes a pair of drive lugs rigidly coupled to a rotatable drive member and extending on opposite sides of an axis of rotation of the drive member. The drive mechanism may comprise a drive sprocket with the drive lugs mounted on a side thereof. Engagement of the drive coupler mechanism is accomplished simply by moving the driven coupler into contact with the drive coupler so that the axes of rotation thereof are relatively closely aligned. As the driven lugs engage the drive lugs, the driven lugs pivot within the mounting block against the resistance of the leaf spring as necessary until the driven lugs reside within the spaces between the drive lugs. Disengagement of the driven coupler from the drive coupler is accomplished simply by moving the driven coupler in an axial direction or a radial direction or in a direction which is a combination thereof relative to the drive coupler. Again, the driven lugs rotate against the resistance of the leaf spring as necessary to permit the driven lugs to clear the drive lug.

Upon engagement the drive and driven lugs remain in contact with each other even when the shafts are not completely axially aligned to provide a continuous driving motion and eliminate the dead spot sliding of previous couplers and the corresponding acceleration-deceleration of the driven shaft.

In a different arrangement according to the invention, the drive lugs as well as the driven lugs are mounted so as to be pivotable in opposite directions against the resistance of a spring. The drive lugs are disposed at the opposite ends of the lug assembly having an intermediate shaft with a relatively flat top surface. The lug assembly is pivotably mounted within a mounting block secured to the drive member. A leaf spring which is also mounted within the mounting block extends over the flat top surface of the shaft to maintain the drive lugs in a neutral position. The drive lugs may be pivoted out of the neutral position in opposite directions therefrom against the resistance of the leaf spring to facilitate automatic engagement of and disengagement from the driven coupler. The double pivoting lugs provide an extra degree of freedom as compared with the single lug arrangement for an even smoother transfer of power from drive to driven shaft.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 13 is a top view of the driven coupler;

FIG. 14 is a sectional view of the driven coupler of FIG. 13 taken along the line 14—14 thereof;

FIG. 15 is a sectional view of an alternative embodiment of an automatically engageable and disengageable drive coupler mechanism in accordance with the invention;

DETAILED DESCRIPTION

Figure 1:
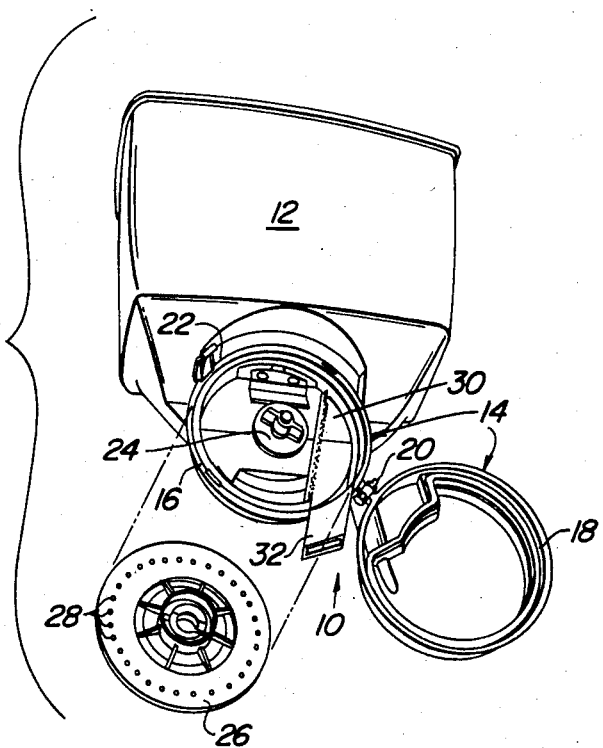
FIG. 1 is a perspective view of a seed meter and an associated seed hopper utilizing an automatically engageable and disengageable drive coupler mechanism in accordance with the invention.

FIG. 1 depicts a vacuum seed meter 10 in conjunction with a seed hopper 12. The vacuum seed meter 10 and the seed hopper 12 which are described in detail in the previously referred to co-pending application of Lundie et al are only described briefly herein so as to form the basis for an understanding of the automatically engageable and disengageable drive coupler mechanisms in accordance with the invention which are used therewith.

The vacuum seed meter 10 has a generally cylindrical housing 14 comprised of a first half shell 16 mounted on the base of the seed hopper 12 and an opposite, mating second half shell 18. The second half shell 18 is coupled to the first half shell 16 via a hinge 20, enabling the seed meter 10 to be opened as shown in FIG. 1. Normally, the second half shell 18 is closed over the first half shell 16 and is held in that position by a clasp 22 on the opposite sides of the half shells 16 and 18 from the hinge 20.

A hub 24 is rotatably mounted within the first half shell 16 at the center thereof. A seed disk 26 is removably mounted on the hub 24 for rotational movement in response to rotation of the hub 24. As described in detail in the Lundie et al application, seeds from a seed mass deposited within the seed hopper 12 flow into the first half shell 16 where they form a seed mass against one side of the seed disk 26. A vacuum source coupled to the interior of the second half shell 18 communicates with a circumferential array of apertures 28 in the seed disk 26. As the seed disk 26 rotates within the cylindrical housing 14 of the seed meter 10, seed cells (not shown) on the opposite side of the seed disk 26 agitate, accelerate and then capture therein individual seeds from the seed mass. The apertures 28 communicate with the bottoms of the seed cells so that the vacuum within the second half shell 18 acts to hold the individual seeds within the seed cells as the seed cells rise out of the seed mass. When each of the seed cells reaches a seed discharge area 30 within the first half shell 16 with continued rotation of the seed disk 26, the effects of the vacuum thereon are cut off, causing the individual seed to be released from the seed cell. The released seed falls through a seed discharge chute 32 at the bottom of the seed discharge area 30 to a furrow in the ground below.

Figure 2:
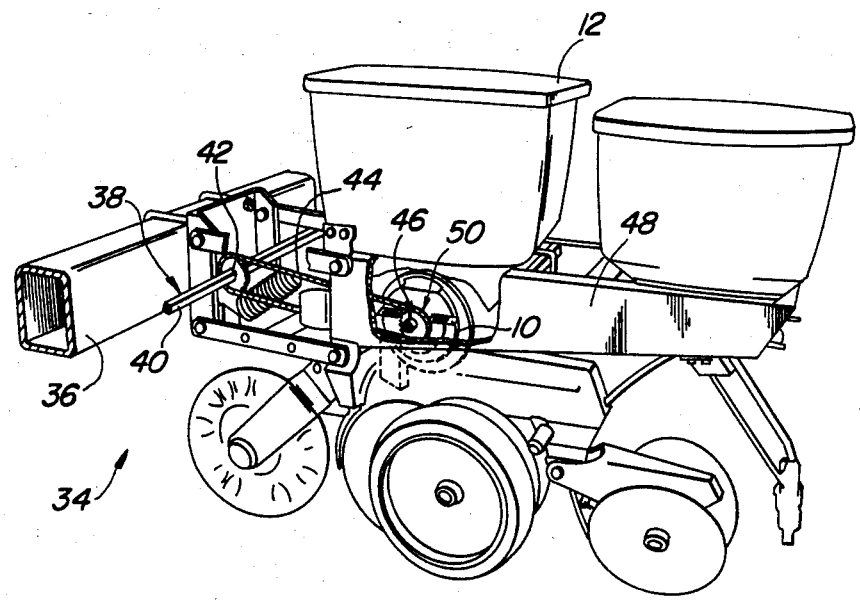
FIG. 2 is a perspective view of a portion of a planter frame with an attached planting unit in which the seed meter and seed hopper of FIG. 1 are removably mounted and from which the seed meter is rotatably driven.

FIG. 2 shows the vacuum seed meter 10 and the seed hopper 12 mounted in place within a planter 34. The planter 34 typically includes a plurality of planting units which include the seed meter-seed hopper combinations and which are mounted in side-by-side relationship behind and along the length of a planter frame 36. However, only a single planting unit with seed hopper-seed meter pair is shown in FIG. 2 for ease of illustration. In cases where the seeds from each seed meter are to be metered into relatively closely spaced rows on the ground, the adjacent planting units must be mounted relatively close to one another.

The planter 34 includes a common drive train 38 for driving the various seed meters mounted thereon. The common drive train 38 includes a rotating bar 40 of generally hexagonal cross-section mounted behind the planter frame 36 and having a plurality of sprockets 42 mounted thereon along the length thereof. Each of the sprockets 42 is disposed in front of a different one of the planter units. The single sprocket 42 shown in FIG. 2 is coupled via a chain 44 to a drive sprocket 46. The drive sprocket 46 which is rotatably mounted within a subframe 48 forming a part of the planter 34 is coupled to drive the seed meter 10 by an automatically engageable and disengageable drive coupler mechanism 50 shown and described in detail hereafter. The drive coupler mechanism 50 disengages automatically and without the need for manual assistance to permit removal of the seed meter 10 and the associated seed hopper 12 from the subframe 48 of the planter 34. When the seed meter 10 and the associated seed hopper 12 are reinstalled on the subframe 48, the drive coupler mechanism 50 provides for coupling of the drive sprocket 46 to the vacuum seed meter 10 automatically and without the need for manual assistance.

Figure 3:
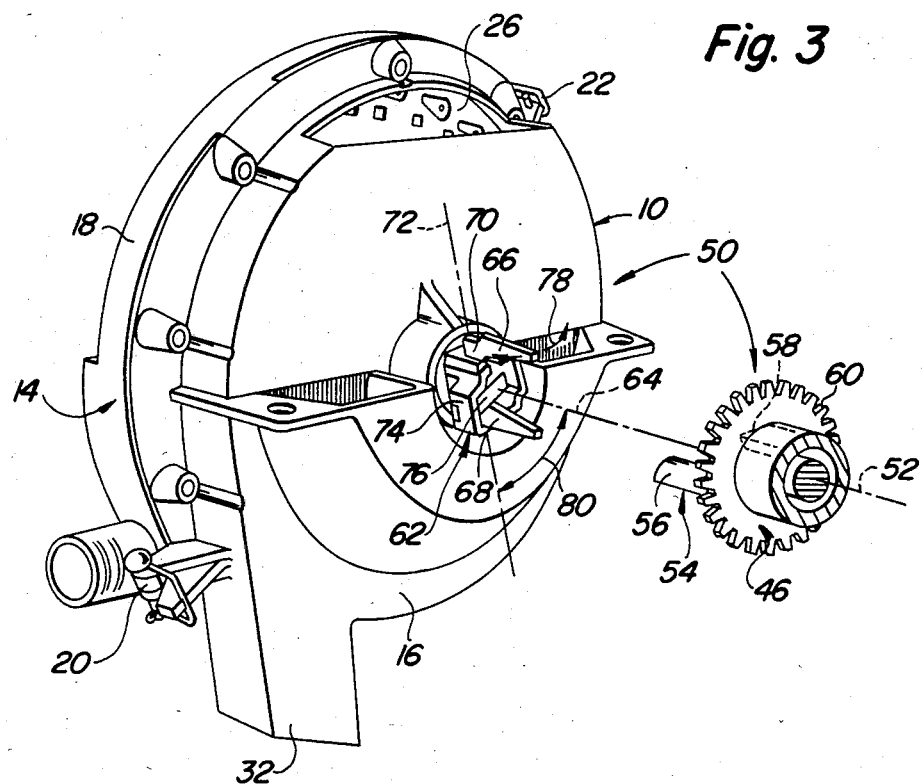
FIG. 3 is a perspective view of the seed meter of FIG. 1 in a closed position in conjunction with a drive gear forming a part of an automatically engageable and disengageable drive coupler mechanism in accordance with the invention.

The drive coupler mechanism 50 is illustrated in FIG. 3 in connection with the side of the seed meter 10. The drive sprocket 46 which is shown in FIG. 3 is rotatable about an axis of rotation 52 and forms a drive coupler 54 in conjunction with a pair of drive lugs 56 and 58 rigidly mounted on a side surface 60 of the drive sprocket 46. The drive coupler mechanism 50 also includes a driven coupler 62 which is disposed on the outside of the side of the seed meter 10 and which is rotatable about an axis of rotation 64. The axis of rotation 64 of the driven coupler 62 is preferably coincident with the axis of rotation 52 of the drive coupler mechanism 50 as shown in FIG. 3. In accordance with the invention, however, the axes 64 and 52 can be misaligned and still provide effective drive coupling between the driven coupler 62 and the drive coupler 54.

As seen in FIG. 3 the driven coupler 62 has an opposite pair of driven lugs 66 and 68 disposed at the opposite ends of a driven lug assembly 70 and rotatable about an axis 72 which intersects and is perpendicular to the axis of rotation 64 of the driven coupler 62. The driven lugs 66 and 68 are disposed on opposite sides of and are generally parallel with the axis of rotation 64 so as to mate with the drive lugs 56 and 58 which are disposed on opposite sides of and are generally parallel with the axis of rotation 52 of the drive coupler 54. The driven lug assembly 70 is pivotally mounted for rotation about the axis 72 by a mounting block 74 which is rotatable about the axis of rotation 64 and which is coupled to the hub 24 for mounting the seed disk 26 within the seed meter 10 as hereafter described.

The leaf spring 76 mounted within the mounting block 74 engages an intermediate portion of the driven lug assembly 70 to normally hold the driven lug assembly 70 in a neutral position shown in FIG. 3. In the neutral position, the driven lugs 66 and 68 extend outwardly in a direction generally parallel to the axis of rotation 64. Movement of the driven lug assembly 70 out of the neutral position as shown by arrows 78 and 80 and provided by rotation about the axis 72 is resiliently resisted by the leaf spring 76.

Figure 4:
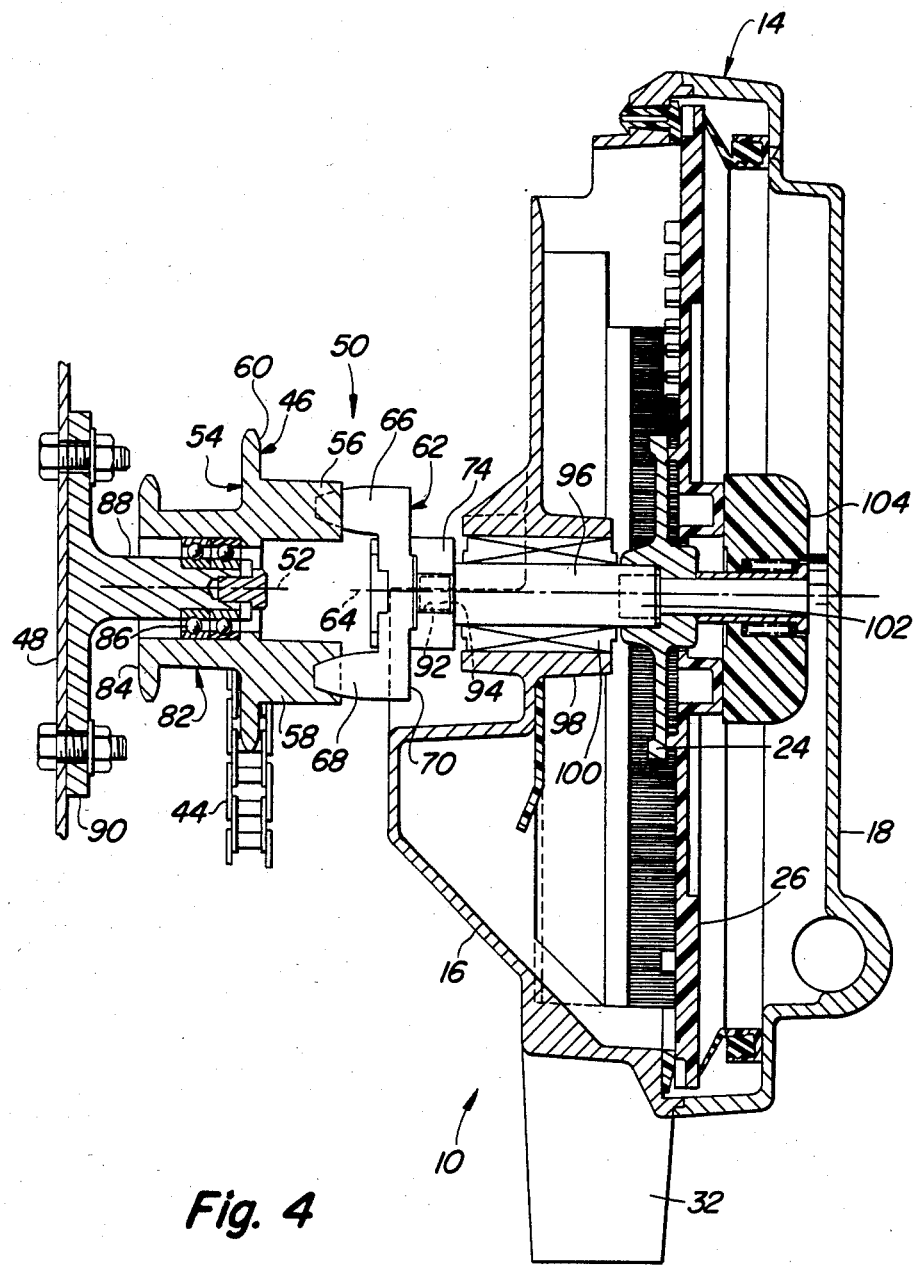
FIG. 4 is a sectional view of the seed meter of FIG. 1 in the closed position and showing the automatically engageable and disengageable drive coupler mechanism.

Referring to FIG. 4 it will be seen that the drive sprocket 46 forms a part of a gear assembly 82 which also includes a sprocket 84 spaced apart from and generally parallel to the drive sprocket 46. The sprocket 84 is coupled via a chain (not shown) to operate other equipment in conjunction with the seed meter 10. The gear assembly 82 is rotatable about the axis of rotation 52 by bearings 86 disposed between a hollow interior of the gear assembly 82 and a gear mounting post 88. The gear mounting post 88 extends outwardly from a base portion 90 thereof which is fastened to the subframe 48 of the planting unit.

The mounting block 74 of the driven coupler 62 has a threaded bore 92 therein for receiving a threaded end 94 of a driven shaft 96. The driven shaft 96 is journaled within a collar 98 formed at the center of the first half shell 16 of the cylindrical housing 14 by bearings 100. The driven shaft 96 has an end 102 thereof opposite the threaded end 94 which mounts the hub 24 thereon. The seed disk 26 is releaseably mounted on the hub 24 by a spring-loaded assembly which includes a handle 104 and which is described in greater detail in a co-pending application of Webber, Ser. No. 546,831 filed Oct. 31, 1983 and commonly assigned with the present application.

The seed meter 10 is held in the position shown in FIG. 4 relative to the subframe 48 by the mounting of the seed hopper 12 on the subframe 48. When the seed hopper 12 is removed from this mounting, the seed meter 10 and its included driven coupling 62 are free to be moved away from the subframe 48 and its included drive coupler 54. Outward movement of the seed meter 10 in the direction of the axes rotation 52 and 64 is typically limited to ⅜″ or less because of the particular mounting mechanism for the seed hopper 12 and the limited amount of space which is present where the seed meters and the associated seed hoppers are mounted close to each other. Accordingly, most of the movement of the seed meter 10 must come in a radial direction, and this is provided by upward lifting of the seed hopper 12 and the attached seed meter 10 as the seed hopper 12 is removed from the subframe 48. It will be appreciated that resiliently restrained movement of the driven lug assembly 70 about the axis 72 permits the driven lugs 66 and 68 to rotate as necessary to clear the drive lugs 56 and 58 as the seed hopper 12 and the seed meter 10 are removed from the planting unit. If the drive lugs 56 and 58 and the driven lugs 66 and 68 are generally vertically disposed as shown in FIG. 4, then the driven lugs 66 and 68 simply slide along the sides of the drive lugs 56 and 58 as the seed meter 10 is lifted away. Should the driven lug 68 strike or otherwise engage the drive lug 56, the driven lug assembly 70 pivots about the axis 72 far enough to permit the driven lug 68 to clear the drive lug 56. If the various lugs 56, 58, 66 and 68 are moved approximately 90° about the axes 62 and 64 from the position shown in FIG. 4 so as to assume a generally horizontal position upon removal of the seed meter 10, then the driven lug assembly 70 simply pivots downwardly until the driven lugs 66 and 68 clear the drive lugs 56 and 58.

Upon installation of the seed hopper 12 and the attached seed meter 10 in the subframe 48 of the planting unit, the resiliently pivotable nature of the driven coupler 62 provides for automatic engagement thereof with the drive coupler 54. During installation of the seed meter 10, most of the movement thereof is radially downward relative to the axes 52 and 64 with a limited amount of axial movement in the direction of the axes 52 and 64 being possible. Normally, the driven lugs 66 and 68 simply enter and reside within the spaces between the drive lugs 56 and 58 where they remain until the drive sprocket 46 is rotated far enough to engage the drive lugs 56 and 58 against the driven lugs 66 and 68. Should one of the driven lugs 66 and 68 strike or otherwise engage one of the drive lugs 56 and 58 during installation of the seed meter 10, the driven lug assembly 70 simply pivots against the resistance of the leaf spring 76 far enough to permit the driven lugs 66 and 68 to clear and slide in between the drive lugs 56 and 58. As in the case of disengagement of the driven coupler 62 from the drive coupler 54 during removal of the seed meter 10, engagement of the couplers 54 and 62 during installation of the seed meter 10 occurs automatically and without the need for manual assistance.

The rotatability of the driven lug assembly 70 also provide a drive disconnect feature. The driven lugs 66 and 68 can be rotated approximately 90° to an overcenter position in which they are disengaged from the drive lugs 56 and 58. This temporarily removes the drive to the seed meter. The driven lugs 66 and 68 remain in the disconnected position until they are rotated back toward the neutral or drive position. This permits one or more planting units to be disabled, such as when point rows are being planted.

Figure 6:
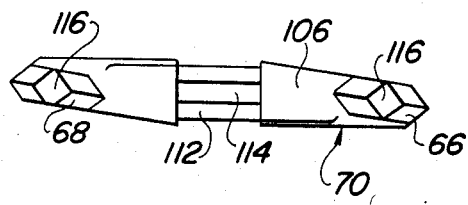
FIG. 6 is a top view of the driven lug assembly of FIG. 5.
Figure 7:
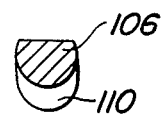
FIG. 7 is a sectional view of the driven lug assembly of FIG. 5 taken along the line 7—7 thereof.
Figure 5:
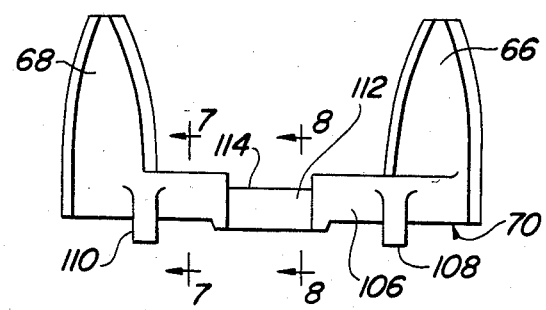
FIG. 5 is a front view of a driven lug assembly forming a part of the driven coupler of the automatically engageable and disengageable drive coupler mechanism.

The driven lug assembly 70 is shown in detail in FIGS. 5-8. As seen therein the driven lug assembly 70 has a generally elongated intermediate portion 106 thereof extending between and coupled to the driven lugs 66 and 68 at the opposite ends thereof. A pair of keepers 108 and 110 extend downwardly from the immediate portion 106 at the opposite ends thereof and serve to maintain the driven lug assembly 70 centered within the mounting block 74. The keeper 110 is shown in FIG. 7 as well as in FIG. 5.

Figure 8:
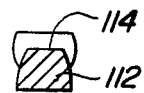
FIG. 8 is a sectional view of the driven lug assembly of FIG. 5 taken along the line 8—8 thereof.

The intermediate portion 106 of the driven lug assembly 70 has a shaft 112 at the center thereof which is formed so as to have a relatively flat upper surface 114 as seen in the sectional view of FIG. 8. The flat upper surface 114 of the shaft 112 normally resides beneath and in contact with the leaf spring 76 to hold the driven lugs 66 and 68 in the neutral position.

As seen in FIG. 6 each of the driven lugs 66 and 68 tapers as it extends upwardly from the intermediate portion 106 to a relatively small and somewhat pointed tip 116 at the top thereof. The pointed tips 116 of the driven lugs 66 and 68 are almost impossible to catch on the drive lugs 56 and 58, and therefore encourage the driven lugs 66 and 68 to slide over the outer ends of and along the sides of the drive lugs 56 and 58. In addition, the drive lugs 56 and 58 are generally rounded except for a flat surface for mating with the driven lugs. The rounded surfaces aid in assuring that the driven lugs slide over the drive lugs.

Figure 9:
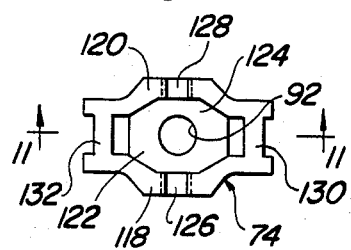
FIG. 9 is a top view of a mounting block forming a part of the driven coupler of the automatically engageable and disengageable drive coupler mechanism.
Figure 11:
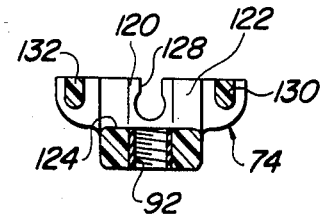
FIG. 11 is a sectional view of the mounting block of FIG. 9 taken along the line 11—11 thereof.
Figure 10:
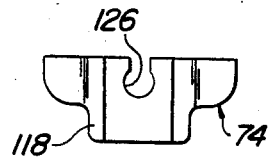
FIG. 10 is a side view of the mounting block of FIG. 9.

The mounting block 74 is shown in detail in FIGS. 9-11. As seen in FIG. 9 the mounting block 74 has opposite sides 118 and 120 forming a cavity 122 therebetween. The cavity 122 has a bottom surface 124 thereof. The threaded bore 92 which receives the threaded end 94 of the driven shaft 96 to mount the mounting block 74 on the driven shaft 96 extends downwardly from the bottom surface 124 through the thickness of the mounting block 74. As seen in FIGS. 10 and 11 as well as in FIG. 9, the opposite sides 118 and 120 have apertures 126 and 128 respectively formed therein. The apertures 126 and 128 are adapted to receive therein opposite portions of the intermediate portion 106 of the driven lug assembly 70 just inside of the keepers 108 and 110. The keepers 108 and 110 reside just outside of the opposite sides 118 and 120 of the mounting block 74 and keep the driven lug assembly 70 from sliding relative to the mounting block 74.

Each of the apertures 126 and 128 has a top portion thereof of slightly smaller dimension than the diameter thereof. With the mounting block 74 made of resilient material such as plastic, this permits the opposite ends of the intermediate portion 106 of the driven lug assembly 70 to be snapped into place and thereafter retained within the apertures 126 and 128.

Figure 12:
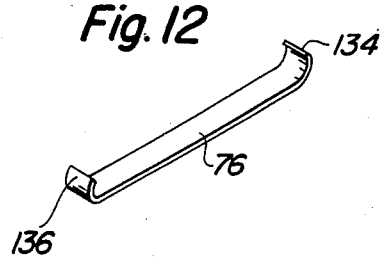
FIG. 12 is a perspective view of a leaf spring forming a part of the driven coupler of the automatically engageable and disengageable drive coupler mechanism.

The mounting block 74 has a pair of bars 130 and 132 at the opposite ends thereof and extending between the opposite sides 118 and 120. As seen in FIG. 11 the bars 130 and 132 are of like cross-section and are adapted to receive opposite ends 134 and 136 of the leaf spring 76 when the spring 76 is mounted in the cavity 122 within the mounting block 74. When the leaf spring 76 which is shown in FIG. 12 is so mounted, it extends generally along an axis intersecting and perpendicular to both the axis of rotation 64 and the axis 72 about which the driven lug assembly 70 rotates.

The assembled driven coupling 62 is shown in FIGS. 13 and 14. It will be seen that the opposite ends 134 and 136 of the spring 76 curl upwardly so as to surround the lower portions of the bars 130 and 132 at the opposite ends of the mounting block 74. This holds the spring 76 in tension with the intermediate portion of the spring extending over and residing against the flat surface 114 of the shaft 112 in the intermediate portion 106 of the driven lug assembly 70. Rotation of the driven lug assembly 70 in either direction from the neutral position as represented by arrows 138 and 140 in FIG. 14 requires the intermediate portion of the leaf spring 76 to flex upwardly as one of the opposite edges of the upper surface 114 of the shaft 112 pushes the underside of the spring 76 upwardly.

The drive coupler mechanism 50 utilizes a rigid drive coupler 54 in which the drive lugs 56 and 58 are mounted on the side surface 60 of the drive sprocket 46 in rigid, nonflexible fashion. Such arrangement has been found to provide automatic disengagement and engagement for most applications of the drive coupler mechanism 50. The pivotable mounting of the driven lug assembly 70 is adequate to provide clearance between the driven lugs 66 and 68 and the drive lugs 56 and 58 in spite of the rigid nature of the drive lugs 56 and 58. In some instances, however, it may be desirable to make the drive coupler 54 flexible or pivotable in conjunction with the pivotable driven lug assembly 70. Such an arrangement is shown in FIG. 15 with the details thereof being hereafter described in connection with FIGS. 16-23.

Referring to FIG. 15 the arrangement shown therein is basically the same as that previously described, with one exception. The exception relates to the fact that the drive sprocket 46 does not have drive lugs 56 and 58 rigidly and inflexibly mounted on the side surface 60 thereof. Instead, the side surface 60 of the drive sprocket 46 has a flexible drive lug arrangement 142 mounted thereon. The flexible drive lug arrangement 142 is comprised of a drive lug assembly 144 pivotably mounted within a mounting block 146 which is secured to the side surface 60 of the drive sprocket 46. A spring 148 (not shown in FIG. 15) which is like the leaf spring 76 is also mounted within the mounting block 146 to hold the drive lug assembly 144 in a neutral position as described hereafter. The drive lug assembly 144 is rotatable within the mounting block 146 about an axis 150 which intersects and is perpendicular to the axis of rotation 52. The drive lug assembly 144 defines an opposite pair of drive lugs 152 and 154 disposed on opposite sides of the axis of rotation 52. FIG. 15 shows the drive lug 152 engaging the driven lug 66 and the drive lug 154 engaging the driven lug 68.

Figure 16:
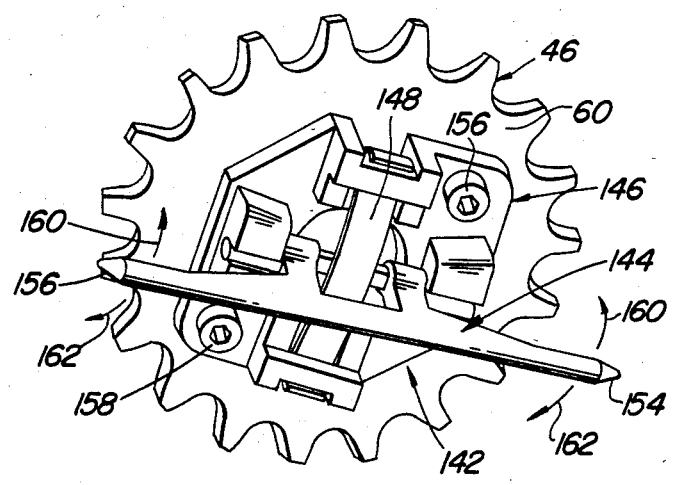
FIG. 16 is a perspective view of the drive coupler of the automatically engageable and disengageable drive coupler mechanism of FIG. 15 in conjunction with a drive gear.

FIG. 16 shows the flexible drive lug arrangement 142 mounted on the side surface 60 of the drive sprocket 46. As previously noted the drive lug assembly 144 is pivotably mounted within the mounting block 146 and is held in the neutral position by the spring 148. The mounting block 146 is secured to the drive sprocket 46 by a pair of opposite screws 156 and 158. The drive lug assembly 144 is movable out of the neutral position against the resistance of the spring 148 in one direction shown by arrows 160 and in an opposite direction shown by arrows 162.

Figure 17:
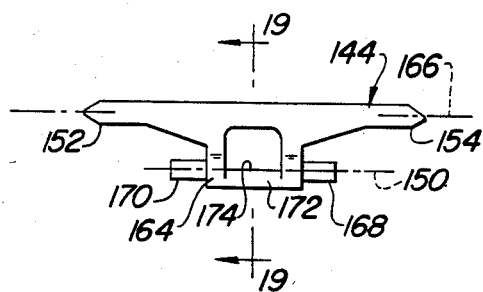
FIG. 17 is a front view of a drive lug assembly forming a part of the drive coupler of FIG. 16.
Figure 18:
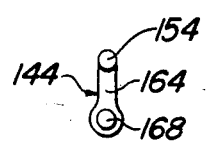
FIG. 18 is a side view of the drive lug assembly of FIG. 17.
Figure 19:
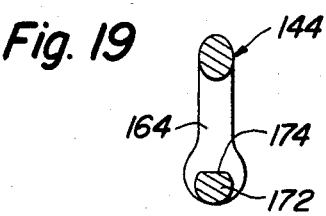
FIG. 19 is a sectional view of the drive lug assembly of FIG. 17 taken along the line 19—19 thereof.

The drive lug assembly 144 is shown in detail in FIGS. 17-19. As seen in FIG. 17 the drive lug assembly 144 has a central portion 164 thereof. The drive lugs 152 and 154 extend outwardly from the opposite ends of the central portion 164 along an upper axis 166 which is parallel to the axis 150. The central portion 164 also includes an opposite pair of pins 168 and 170 extending outwardly from the opposite ends thereof along the axis 150. The pins 168 and 170 are received within the mounting block 146 to rotatably mount the drive lug assembly 144 therein.

The central portion 164 has a shaft 172 extending therealong just below the axis 150 and having a relatively flat upper surface 174. The spring 148 resides on the flat upper surface 174 to hold the drive lug assembly 144 in the neutral position.

Figure 20:
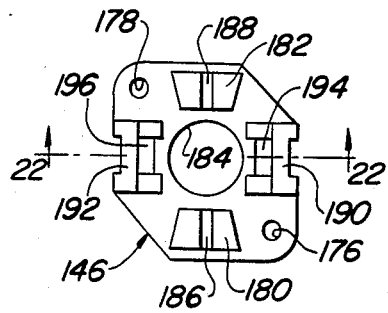
FIG. 20 is a top view of a mounting block forming a part of the drive coupler of FIG. 16.
Figure 21:
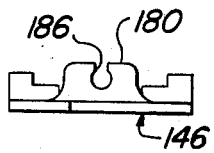
FIG. 21 is a front view of the mounting block of FIG. 20.
Figure 22:
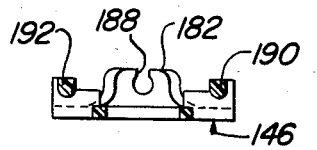
FIG. 22 is a sectional view of the mounting block of FIG. 20 taken along the line 22—22 thereof.

The mounting block 146 is shown in detail in FIGS. 20-22. Diagonally disposed apertures 176 and 178 receive the screws 156 and 158 shown in FIG. 16 to mount the block 146 on the drive sprocket 46. The mounting block 146 has a pair of raised portions 180 and 182 thereof disposed on opposite sides of a central aperture 184 therethrough. The raised portion 180 has an aperture 186 therein for receiving the pin 168 of the drive lug assembly 144. The raised portion 182 has an aperture 188 therein for receiving the pin 170 of the drive lug assembly 144. As seen in FIGS. 21 and 22 the apertures 186 and 188 are dimensioned to be slightly smaller at the top thereof than the diameter thereof. With the mounting block 146 made of resilient material such as plastic, this allows the pins 168 and 170 of the drive lug assembly 144 to snap into and be rotatably retained within the apertures 186 and 188.

The mounting block 146 also has a pair of bars 190 and 192 formed therein on opposite sides of the central aperture 184 between the raised portions 180 and 182. The bar 190 resides above a recess 194 in the outer edge of the mounting block 146. The bar 192 resides within a recess 196 within an edge of the mounting block 146 opposite the recess 194. The bars 190 and 192 receive the opposite ends of the leaf spring 148 when the spring 148 is mounted in the mounting block 146.

Figure 23:
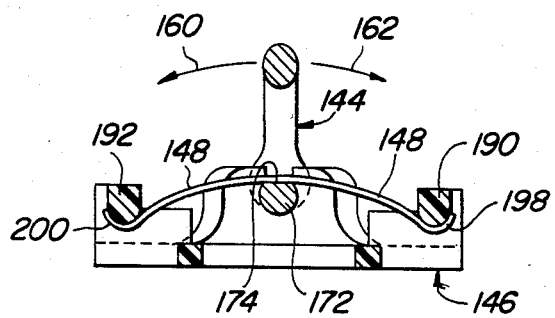
FIG. 23 is a sectional view of the drive coupler of FIG. 16.

FIG. 23 is a sectional view of the flexible drive lug arrangement 142 with the drive lug assembly 144 and the spring 148 mounted in place within the mounting block 146. It will be seen that the spring 148 has one end 198 thereof disposed under and curled around the bar 190 and an opposite end 200 thereof disposed under and curled around the bar 192. The center of the spring 148 resides on the flat upper surface 174 of the shaft 172 at the central portion 164 of the drive lug assembly 144. The spring 148 is held under tension in this position to maintain the drive lug assembly 144 in the neutral position shown in FIG. 23. The drive lug assembly 144 is rotatable in either direction shown by the arrows 160 and 162 against the resistance of the spring 148 the flex of which is increased as the shaft 172 is rotated in either direction from the neutral position.

It will be appreciated that the flexible drive lug arrangement 142 provides increased flexibility when used in conjunction with the driven coupler 62 which is itself flexible in nature. The flexible nature of the drive lug arrangement 142 can provide for faster and more positive automatic disengagement and engagement in certain situations when compared with use of the rigid drive coupler 54.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A disengageable driving arrangement comprising the combination of:

a drive member rotatable about an axis of rotation;

a drive coupler coupled to the drive member and having a pair of drive lugs, the drive lugs being of narrow, elongated configuration and extending outwardly from the drive coupler on opposite sides of the axis of rotation of the drive member;

a driven member disposed adjacent the drive member and rotatable about an axis of rotation;

a driven coupler coupled to the driven member and having a pair of driven lugs on opposite sides of the axis of rotation of the driven member, the pair of driven lugs adapted to be engaged by the pair of drive lugs;

means for permitting rotation of the pair of driven lugs about an axis extending in a different direction from the axis of rotation of the driven member;

the pair of driven lugs being mounted on opposite ends of an intermediate member extending therebetween so as to move together with the intermediate member as a single element; and means for resiliently biasing the pair of driven lugs into a neutral position in which the driven lugs are generally parallel to the axis of rotation of the driven member, the pair of driven lugs and the included intermediate member being rotatable in opposite directions from the neutral position against resilient resistance of the means for resiliently biasing.

2. A disengageable driving arrangement comprising the combination of:

a drive member rotatable about an axis of rotation;

a drive coupler coupled to the drive member and having a pair of drive lugs, the drive lugs being of narrow, elongated configuration and extending outwardly from the drive coupler on opposite sides of the axis of rotation of the drive member;

a driven member disposed adjacent the drive member and rotatable about an axis of rotation;

a driven coupler coupled to the driven member and having a pair of driven lugs on opposite sides of the axis of rotation of the driven member, the pair of driven lugs adapted to be engaged by the pair of drive lugs; and means for permitting rotation of the pair of driven lugs about an axis extending in a different direction from the axis of rotation of the driven member;

the pair of drive lugs being mounted on the drive coupler in a manner to permit rotation of the pair of drive lugs as a fixed, integral unit about an axis extending in a different direction from and intersecting the axis of rotation of the drive member, the pair of drive lugs normally residing within a plane defined by the axis extending in a different direction and the axis of rotation and both of them being movable to one side or the other of the plane upon rotation of the pair of drive lugs as a fixed, integral unit about the axis extending in a different direction.

3. A disengageable driving arrangement comprising the combination of:

a drive member rotatable about an axis of rotation;

a drive coupler coupled to the drive member and having a pair of drive lugs on opposite sides of the axis of rotation of the drive member;

a driven member disposed adjacent the drive member and rotatable about an axis of rotation;

a driven coupler coupled to the driven member and having a pair of driven lugs on opposite sides of the axis of rotation of the driven member, the pair of driven lugs adapted to be engaged by the pair of drive lugs; and means for permitting rotation of the pair of driven lugs about an axis extending in a different direction from the axis of rotation of the driven member;

the pair of drive lugs being mounted on the drive coupler in a manner to permit rotation of the pair of drive lugs about an axis extending in a different direction from the axis of rotation of the drive member, the axis extending in a different direction from the axis of rotation of the drive member intersecting and being perpendicular to the axis of rotation of the drive member and the pair of drive lugs forming part of a rotatable drive lug assembly, and further including means for resiliently biasing the drive lug assembly into a neutral position in which the drive lug assembly extends in the direction of the axis of rotation of the drive member, the drive lug assembly being rotatable in opposite directions from the neutral position against resilient resistance of the means for resiliently biasing.

4. A drive arrangement comprising the combination of:

a drive member mounted for rotation about an axis of rotation thereof;

a mounting member coupled to be rotated by the drive member;

a lug assembly having a central portion thereof rotatably mounted on the mounting member about an axis extending in a direction different from the axis of rotation of the drive member and having a pair of drive lugs extending outwardly from the central portion in opposite directions; and a resilient element mounted within the mounting member and engaging the lug assembly, the resilient element normally biasing the lug assembly into a neutral position about the axis extending in a direction different from the axis of rotation of the drive member.

5. The invention set forth in claim 4, wherein the drive member comprises a sprocket gear and the mounting member is mounted on a side of the sprocket gear.

6. The invention set forth in claim 4, wherein the lug assembly has an elongated upper portion extending along a first axis through the central portion and having opposite ends defining the pair of drive lugs, the central portion has a shaft therein having a relatively flat upper surface and opposite end portions extending along a second axis generally parallel to the first axis, the second axis comprising said axis extending in a direction different from the axis of rotation of the drive member, the mounting member has a pair of opposite apertures therein for rotatably receiving the opposite end portions of the central portion of the lug assembly therein, and the resilient element comprises a leaf spring having opposite ends thereof coupled to opposite portions of the mounting member and an intermediate portion extending over and contacting the relatively flat upper surface of the shaft in the central portion of the lug assembly.

7. The invention set forth in claim 6, wherein the second axis intersects and is generally perpendicular to the axis of rotation of the drive member and the leaf spring is of elongated configuration and extends in a direction generally perpendicular to the second axis and intersects and is generally perpendicular to the axis of rotation of the drive shaft, the leaf spring being held in tension across the relatively flat upper surface of the shaft in the central portion of the lug assembly.

8. A driven arrangement comprising the combination of:
- a driven shaft mounted for rotation about an axis of elongation thereof;
- a mounting member coupled to rotate with the driven shaft;
- a lug assembly having an intermediate portion thereof rotatably mounted on the mounting member about an axis extending in a direction different from the axis of elongation of the driven shaft and having a pair of driven lugs extending outwardly from the intermediate portion on opposite sides of the intermediate portion; and
- a resilient element mounted within the mounting member and engaging the lug assembly, the resilient element normally biasing the lug assembly into a neutral position about the axis extending in a direction different from the axis of elongation of the driven shaft.

9. The invention set forth in claim 8, wherein the driven shaft has a threaded portion at an end thereof extending along the axis of elongation and receiving the mounting member thereon.

10. The invention set forth in claim 8, wherein the pair of drive lugs are mounted at opposite ends of the intermediate portion of the lug assembly and extend in a common direction generally perpendicular to the axis extending in a direction different from the axis of elongation, the intermediate portion of the lug assembly has a relatively flat upper surface, the mounting member has a pair of opposite apertures therein for rotatably receiving opposite portions of the intermediate portion of the lug assembly therein, and the resilient element comprises a leaf spring having opposite ends thereof coupled to opposite portions of the mounting member and an intermediate portion extending over and contacting the relatively flat upper surface of the intermediate portion of the lug assembly.

11. The invention set forth in claim 10, wherein the axis extending in a direction different from the axis of elongation intersects and is generally perpendicular to the axis of elongation and the leaf spring is of elongated configuration and extends in a direction generally perpendicular to the axis extending in a direction different from the axis of elongation and intersects and is generally perpendicular to the axis of elongation of the driven shaft, the leaf spring being held in tension across the relatively flat upper surface of the intermediate portion of the lug assembly.

* * * * *